Feb. 1, 1955  A. PERROTTET  2,700,798
BUILDING FOR THEATRICAL AND OTHER PERFORMANCES
Filed Aug. 9, 1950  10 Sheets-Sheet 1
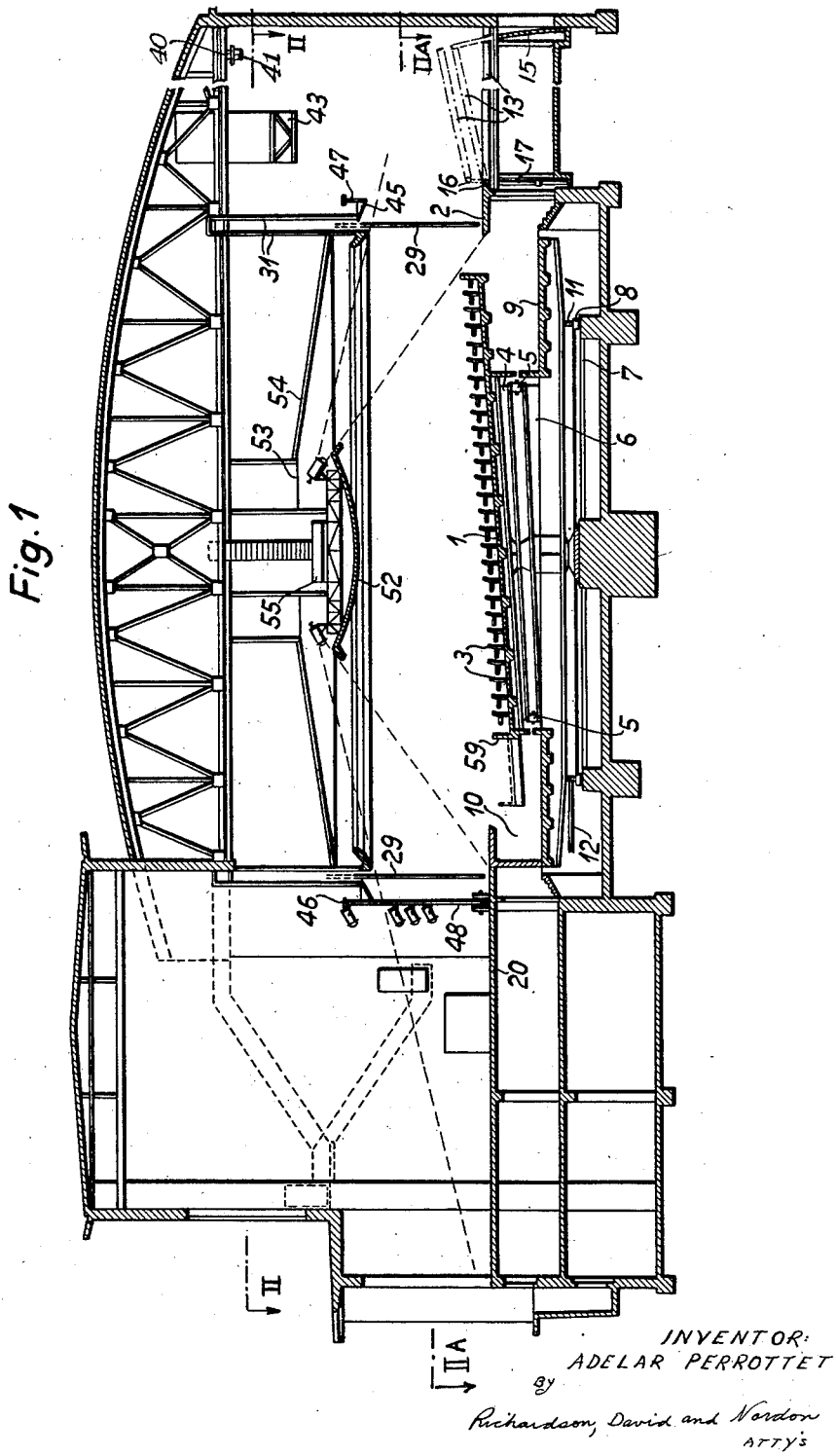
INVENTOR:
ADELAR PERROTTET
By
Richardson, David and Nordon
ATTY's

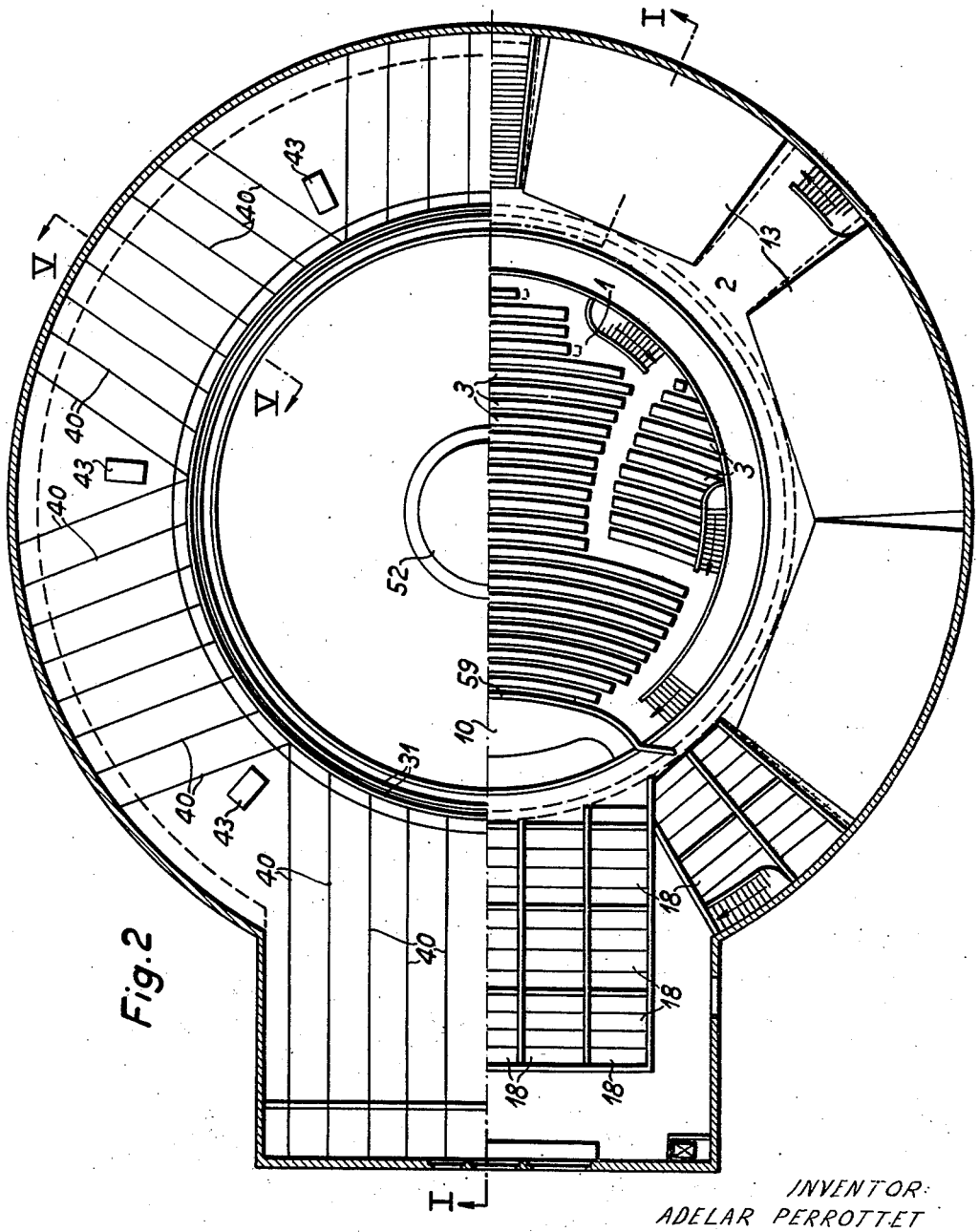

Feb. 1, 1955　　　A. PERROTTET　　　2,700,798
BUILDING FOR THEATRICAL AND OTHER PERFORMANCES
Filed Aug. 9, 1950　　　　　　　　　　　　10 Sheets-Sheet 3
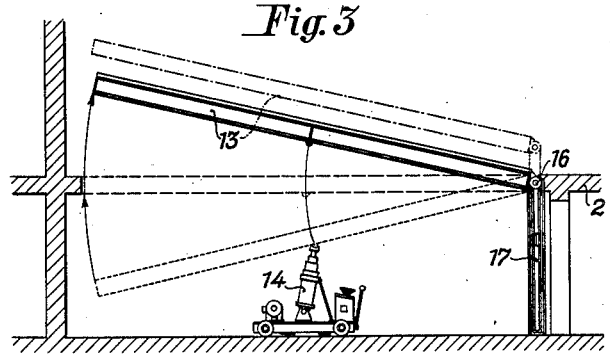
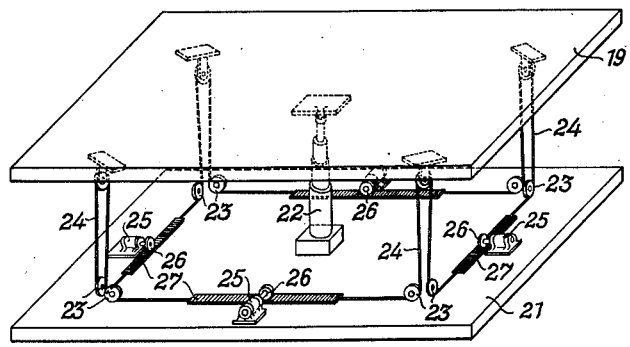
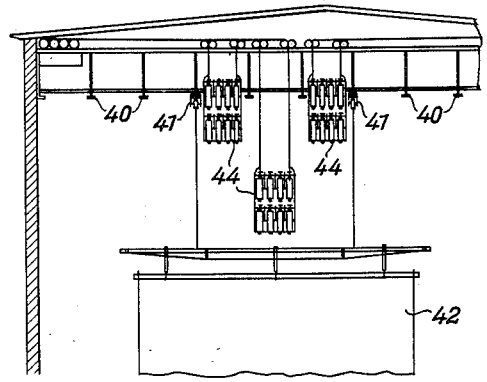
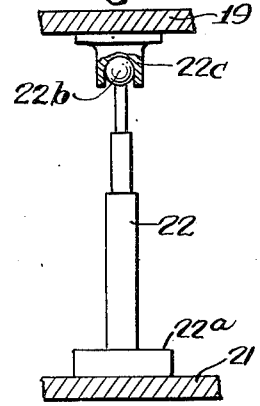
INVENTOR:
ADELAR PERROTTET
BY
Richardson, David and Nordon
ATTYS

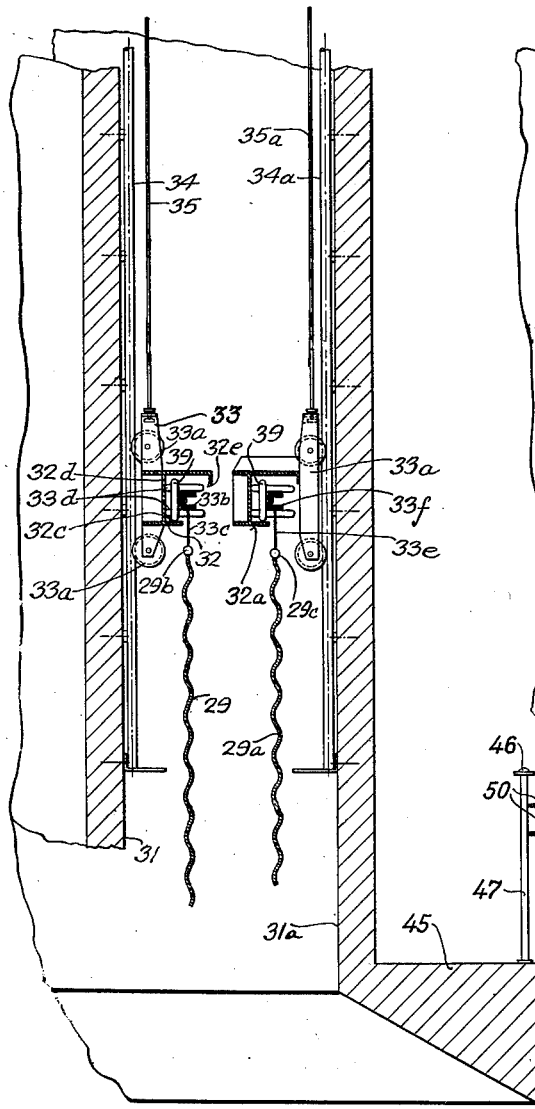
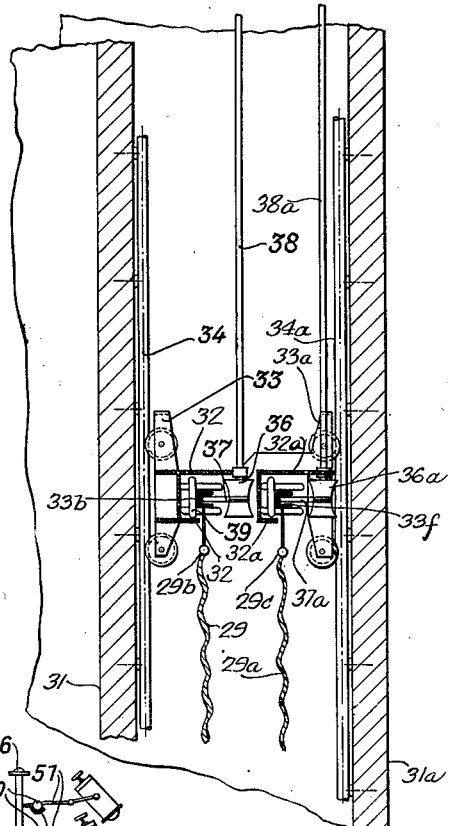

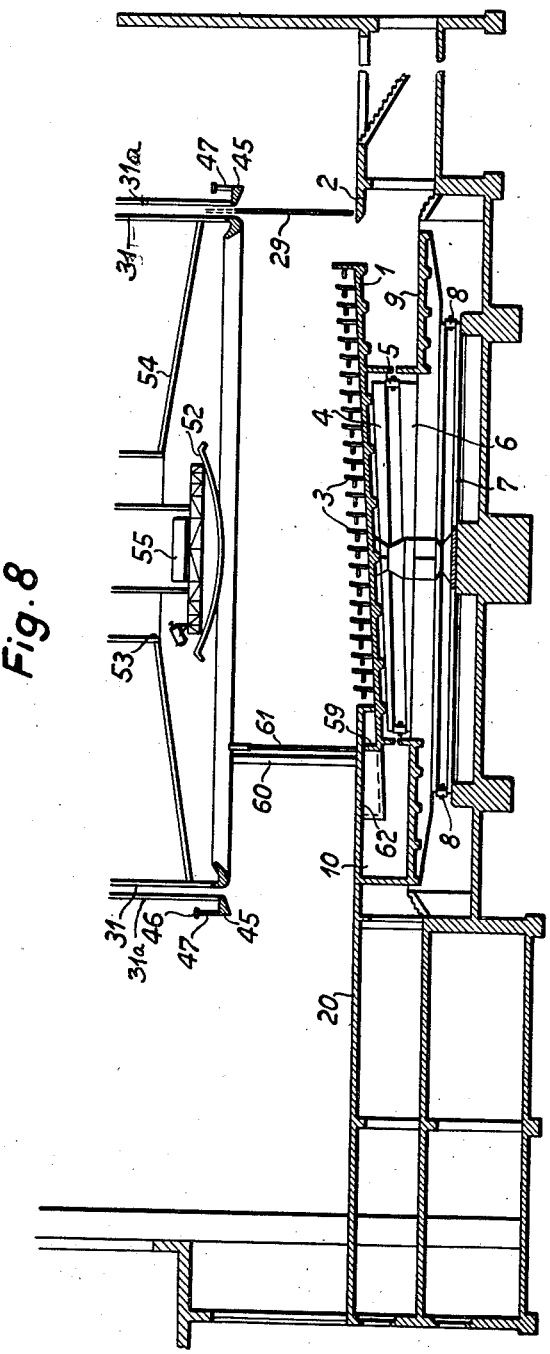

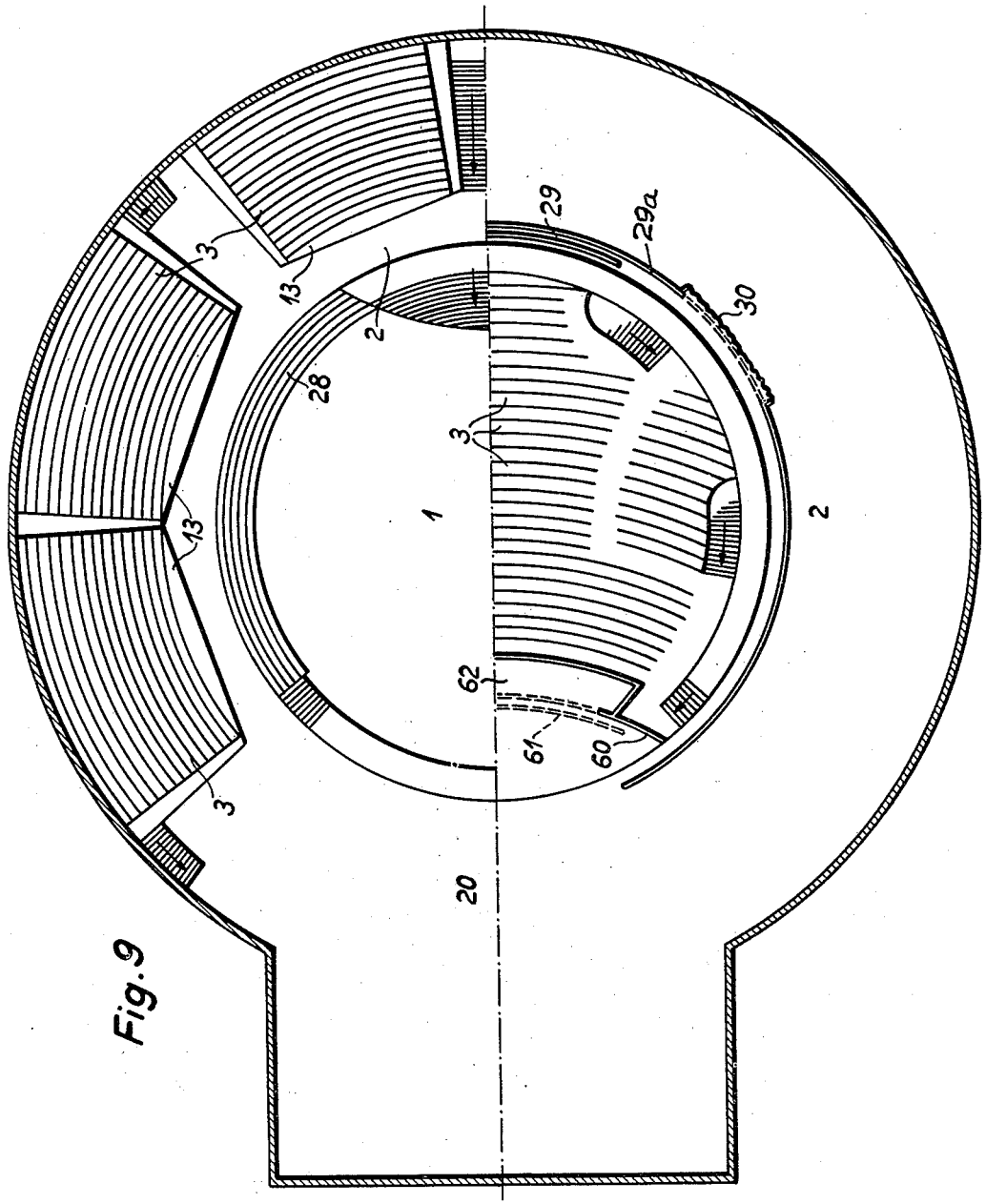

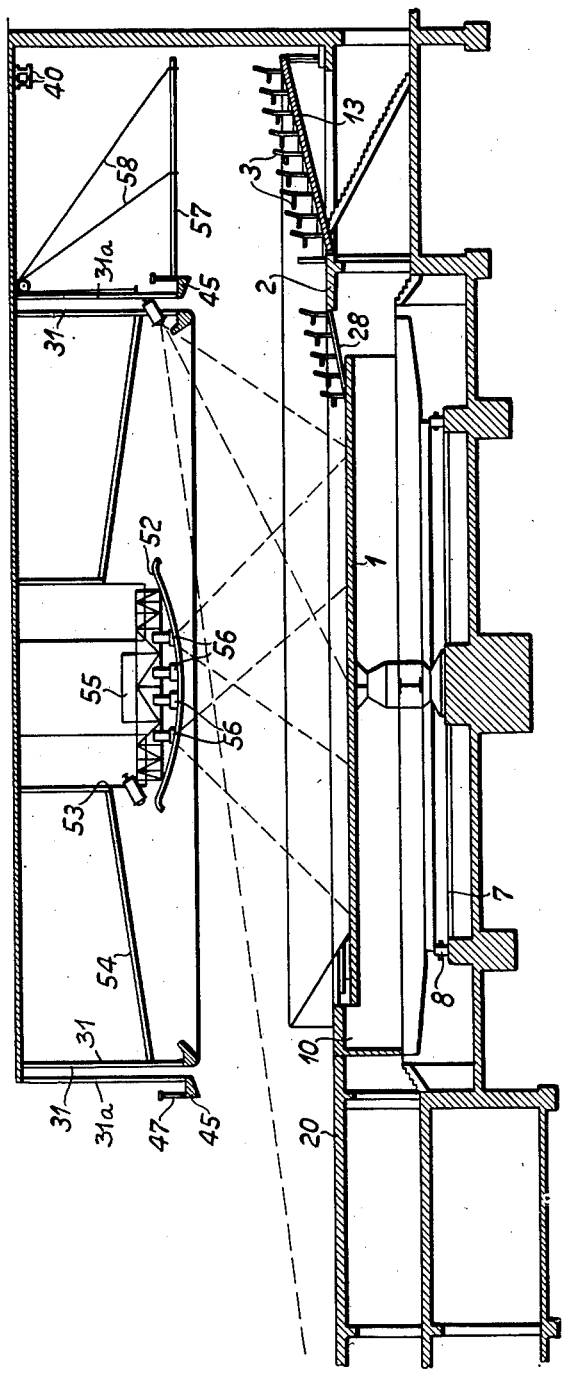

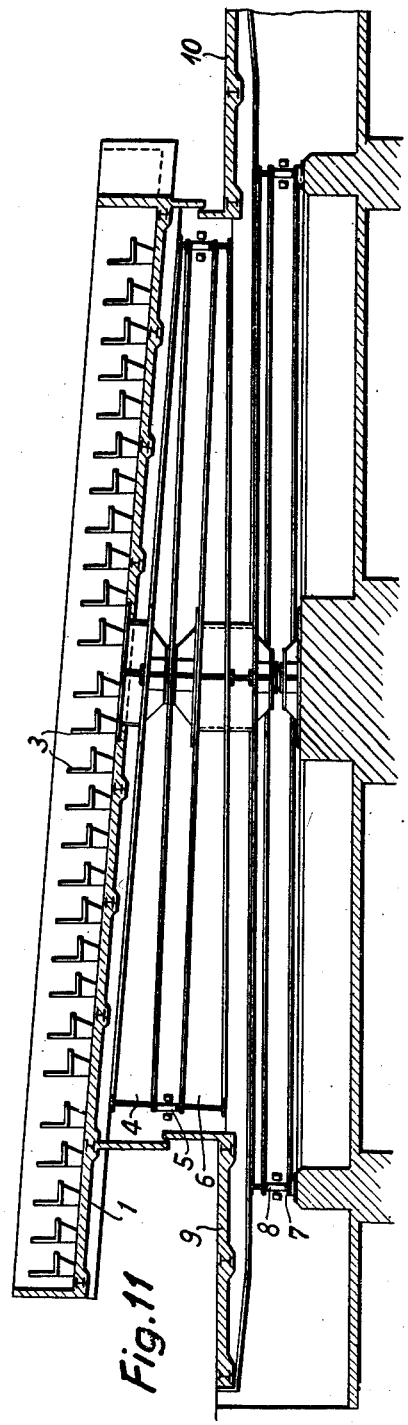
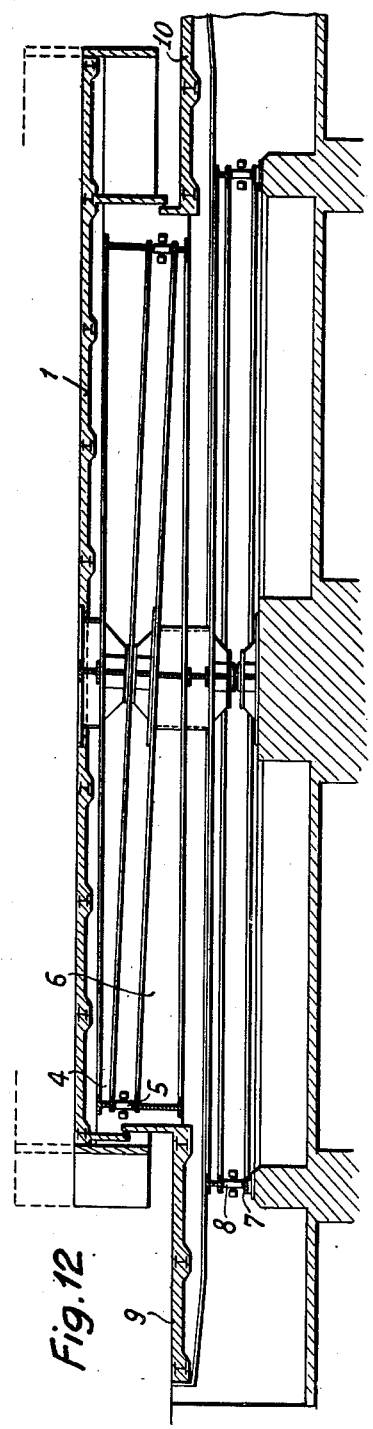

Feb. 1, 1955　　　A. PERROTTET　　　2,700,798
BUILDING FOR THEATRICAL AND OTHER PERFORMANCES
Filed Aug. 9, 1950　　　10 Sheets-Sheet 9
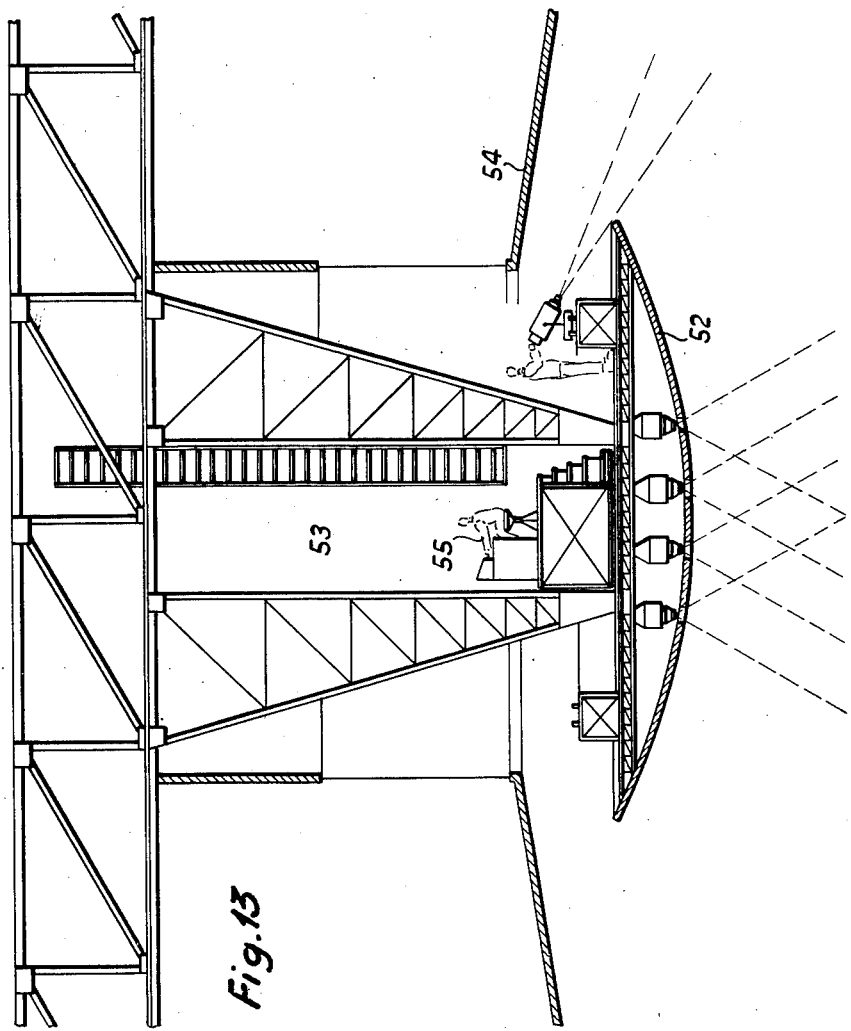
INVENTOR:
ADELAR PERROTTET Feb. 1, 1955    A. PERROTTET    2,700,798
BUILDING FOR THEATRICAL AND OTHER PERFORMANCES
Filed Aug. 9, 1950    10 Sheets-Sheet 10
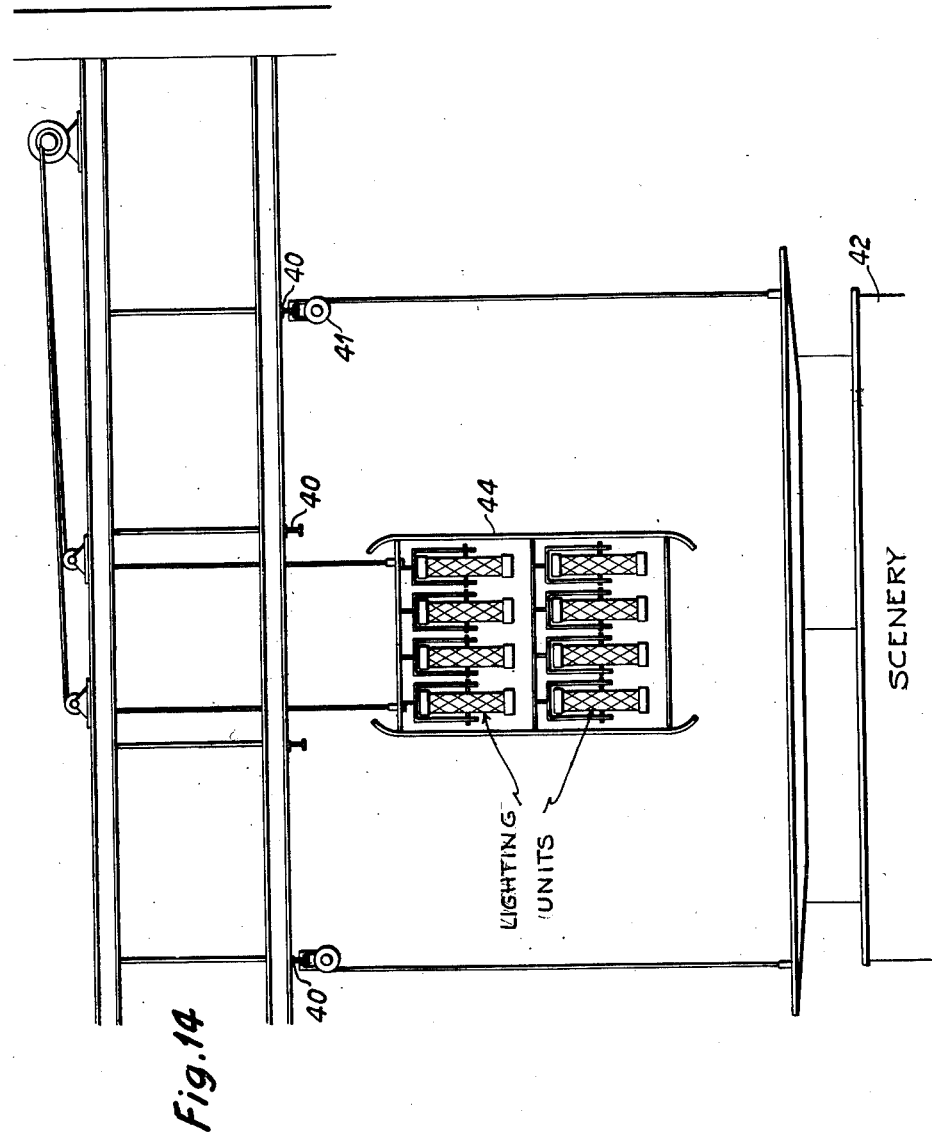
INVENTOR:
ADELAR PERROTTET
By
Richardson, David and Nordon
ATTYS

United States Patent Office 2,700,798
Patented Feb. 1, 1955

2,700,798

BUILDING FOR THEATRICAL AND OTHER PERFORMANCES

Adelar Perrottet, Basel, Switzerland, assignor of one-half to Erwin Stoecklin, Basel, Switzerland Application August 9, 1950, Serial No. 178,417

Claims priority, application Switzerland August 16, 1949

23 Claims. (Cl. 20—1.12)

The invention relates to a building for theatrical and other performances having a rotary center part. Theatre buildings are known in which there is a rotary space allotted for the audience (house), located within eccentrically arranged individual stages, in which case the self-contained "house" is rotary as a whole. It is further known partially to surround a rotary house with a stage disposed arcuately and externally thereto, while a part of the house opens outwards directly. Finally, it is known to arrange rotary annular stage segments about a fixed house.

However, with the theatre buildings known only such effects can be produced as can be attained by means of the usual stages. With the mode of execution known of a stage partly surrounding the rotary house the surface of the stage intended for the performance is interrupted by partitions so that the performance cannot continuously develop in one direction. With this well-known type of theatre building, designed to produce panoramic effects, it is not possible completely to open the whole space of the stage, as a portion of said space is always kept hidden from the audience, considering that the curtain cannot be shoved together completely. Besides, with the theatre buildings known, a great many constructive expedients must be restorted to, in order to cover the stage which is made into a self-contained and independent part of the building. Hence, these types of theatre buildings have never encountered much appreciation.

The object of the present invention is to create a new type of building, appropriate for purposes of all kinds e. g. for theatres, play-houses, cinemas, circus, dancing halls, skating rinks, concert and popular music halls, halls for festivals and exhibitions, gymnastic halls, and the like. In particular the invention, when applied to theatre buildings, has for its object to produce novel effects in the reproduction of plays by means of various stage configurations differing from the hitherto known achievements of stages, and especially to produce novel panoramic effects based on the unidirectional flow of reproduction. The realisation of these technical possibilities will prove highly alluring for the play-goers, besides increasing the economic and financial potentialities of the building by enlarging its field of use. The profitability of these buildings is further enhanced by these effects being attained with the help of simple constructive means and so as to reduce to a minimum the number of operators required.

The principal feature of the invention consists in that the essentially disc-like central part of the building is not only rotary, but also lends itself to be tilted out of the horizontal plane, this central part being surrounded by a stationary, partitionless annular plane. Hence, it is possible to make use of the central part in its inclined position for accommodating the audience, or to employ it as an arena when in its horizontal position. Taking into account the disc-like shape of the central part, the different motions, assigned to it, can be brought about without any noteworthy technical difficulty, nor is there any sizable consumption of power to be reckoned with.

The stationary, partitionless annular plane permits building up thereupon a stage of panoramic effect, or to prepare individual sceneries before the beginning of the play, thus making for a considerable saving of time.

Various features, advantages, and other objects of the invention will become apparent upon reading the following specification together with the accompanying drawing forming a part hereof.

Referring to the drawing:

Figure 1 is a sectional view in side elevation of a building embodying the present invention, taken along the line 1—1 of Fig. 2;

Figure 2 is a composite plan sectional view of the upper half being taken along the line II—II of Fig. 1 and the lower half being taken along the line IIA—IIA of Fig. 1.

Figure 3 is an enlarged fragmentary sectional view in elevation illustrating portable means for upwardly tilting an individual segment of an annular portion of a building in accordance with the invention.

Figure 4 is a fragmentary perspective view of a segmentary portion of the annular part of a building embodying the invention and illustrating universally adjustable means for tilting the upper surface of the segmentary portion at any desired relatively small angle with respect to the horizontal.

Figure 4A is an enlarged fragmentary view, partly in sectional elevation, illustrating the centrally located supporting post for the segmentary annular member shown in Fig. 4, and showing details of a ball joint pivot which supports the segmentary annular member.

Figure 5 is a fragmentary view in sectional elevation looking in a generally radial direction with respect to the center of the building and illustrating radially vertically movable scenery and lighting devices.

Figure 6 is an enlarged fragmentary sectional view in elevation showing spaced concentric cylindrical walls and means for raising and lowering movable semicircular enclosures between the walls for screening off the center of the building at will from its annular peripheral portion.

Figure 7 is a view similar to Fig. 6, additionally illustrating means for producing peripheral movement of the semicircular enclosures for selectively exhibiting or concealing a desired annular portion of the building.

Figure 8 is an enlarged sectional view in elevation similar to Fig. 1, with the roof portion of the building omitted.

Figure 9 is a plan view similar to Fig. 2, with the upper portion of the figure showing the building arranged as an arena.

Figure 10 is a sectional view in elevation showing the building arranged as an arena.

Figure 11 is an enlarged view in sectional elevation showing the central portion of the building arranged for seating an audience with the central portion and its seating facilities inclined at an angle.

Figure 12 is a view similar to Fig. 11, showing the central portion of the building substantially horizontal with the seating facilities removed to permit its use as an arena.

Figure 13 is an enlarged view in sectional elevation showing a centrally located illumination control gondola.

Figure 14 is an enlarged fragmentary view showing the vertically and radially movable scenery and lighting equipment of Fig. 5.

The building is of substantially circular shape with the necessary annexes of which only the annex for lodging the main stage has been represented. The main part of the building is the rotary center part which is enclosed by a stationary, partitionless annular or ring-shaped floor part 2. The seating arrangement 3 is curved, the radius of curvature being adapted to the annular part 2. Likewise, the seats are grouped into segments, so as to be alternately available for use on the centre and on the floor part or ring. By providing a reserve of seats the number of the seating accommodations may be increased both on the center and on the ring, e. g. in case of grand festivals and the like.

For rotating and tilting the center part 1 this is mounted on a wedge-shaped ring 4 that runs—by means of rollers 5—on a further wedge-shaped ring 6, having the same taper, which—connected to a horizontal guide ring 7—runs on the rollers 8. With the ring 6 a gangway 9 and the orchestra space 10 are connected. The horizontal ring 11 is formed into a capstan. At said capstan 11 a traction member is shown. When this traction member 12 is operated, the center 1 with the ring 6, the gangway 9 and the orchestra space 10 are compelled to rotate. If the wedge-shaped ring 4 is held fast and the wedge-shaped ring 6 is rotated on the rollers 8, then the inclined position of the central part is altered between a maximum angle of inclination (pitch) and the horizontal position. Instead of rails e. g. annular grooves can be arranged in the concrete foundation, in which case the runners are preferably provided with rubber tires.

When employing the building as an arena stage according to Fig. 9, upper part and Fig. 10, the annular surface (ring) 2 must be given an inclined position so as to assure an unrestricted field of vision to the play-goers.

This inclination (pitch) is realized, according to Fig. 1, Fig. 2 lower section, Fig. 3 and Fig. 9 in such a manner that in the annular surface segment-shaped parts 13 are tiltably arranged. For tilting up the parts 13 either portable lifting devices 14, or fixed lifting devices 15 are provided. Under certain circumstances it is also advisable to make the tilting axles 16 of the segment-shaped parts 13 liftable and lowerable by means of lifting devices 17, as far as the rear estrades directly facing the main stage are concerned.

Furthermore in Fig. 2, the lower part illustrates the manner in which the segment-shaped portions 13 are constituted by a plurality of removable boxes 18 whereby traps can be formed at any point desired.

Fig. 4 shows a mode of execution which renders it possible to give panel 19 of the annular surface 2 an oblique position in any direction desired. This titlting method is particularly important for the main stages 20. For this purpose the main stage panel 19 is tiltably supported with respect to the lower panel 21 by means of a central pivot post 22, provided with a ball joint. As shown in Fig. 4A, the central supporting post 22 comprises an enlarged base portion 22a which rests upon the floor or lower panel 21. The upper end of post 22 terminates in a ball portion 22b. A socket member 22c is recessed to receive the ball 22b and to be supported thereby, thus forming a ball and socket joint which permits universal tilting adjustment of the main stage panel 19.

The main stage part 19 and the lower panel 21 are connected with each other by an endless pull rope 24, running in a sunken position over likewise sunken rollers 23. At four points driving and fixing devices 25 are arranged, which e. g. consist of gears 26 driven by motors and engaging racks 27 inserted at predetermined and symmetrical intervals along the length of the pull rope 24. If e. g. the two gear wheels 26, arranged at the right and the left hand side, are held fast, whilst the gears 26, located in front and behind are driven, the main stage panel 19 is obliquely sunk to the left or to the right. In case of the control being reversed, the panel 19 is inclined towards the front or towards the rear. If, however, the gear wheels 26, arranged around the same corner, are held fast and if the two other gear wheels are driven in the same direction, the main stage panel 19 is tilted in respect to the one or the other diagonal.

The interval between the central part 1 and the annular surface (ring) 2, in which the gangway 9 is located, is made overbridgeable for special purposes by insets 28 so that same may be provided with seats (see Figs. 9 and 10).

Provision is made for screening off the central circular portion 1 of the building from the surrounding annular part 2 and for exhibiting or concealing any desired portion of the annular part of the building at will. For this purpose, two vertically movable screening members 29 and 29a are provided (Fig. 6), each being of semicylindrical configuration and the outer member 29a having a greater radius of curvature concentric with the curvature of the inner member 29 so that they may be positioned in spaced overlapping relationship with respect to each other with the outer screening member 29a disposed outside the inner member 29. The screening members 29 and 29a may be solid, or they may be formed as curtains if desired. In Figs. 6 and 7 they have been diagrammatically shown as curtains, this being indicated by wavy vertical lines. A small separately manually controllable central applause curtain 30 may be provided in each of the screening members 29 and 29a as shown in Fig. 9.

The inner curtain 29 is connected to a series of supporting curtain rings 29b which are disposed at spaced intervals along the semicircular top of the curtain 29.

Extending downwardly from the roof structure of the building are inner and outer cylindrical walls 31 and 31a, respectively, which are coaxial with the circular central part 1 of the building, the bottom edges of the walls 31 and 31a being located above the inner edge portion of the annular part 2 of the building and adjacent to the central part 1. The length of the walls 31 and 31a is preferably somewhat longer than the length of the curtains 29 and 29a so that the curtains may be drawn up between the walls 31 and 31a and completely concealed from view, the curtains 29 and 29a being sufficiently long to reach the floor of the annular part 2 in their lowered positions. Conveniently, the walls 31 and 31a may be constructed in the form of trelliswork.

A horizontal circular guide rail 32 encircles the inner wall 31 and is supported by a series of horizontally spaced vertically movable guide members 33 each provided with peripherally grooved wheels 33a which ride on vertical guide rails 34 fixed to the outer surface of inner cylindrical wall 31. A control rope 35 is connected to the upper end of each guide member 33, and each rope 35 extends to a suitable rope drum (not shown) for raising and lowering the circular rail 32.

A semicircular channel member 33a which lies in a generally horizontal plane extends above the top of the semicircular curtain 29 and cords 33b extend downwardly from the channel member 33a for supporting the curtain rings 29b and the curtain 29 which is secured thereto. The lower portion 32c of circular rail 32 engages wheels 39 having horizontal axes of rotation, the wheels 39 being rotatably secured to the inner vertical surface of the inner semicircular channel member 33a, thereby permitting the channel member 33a and the inner curtain 29 supported thereby to ride around the entire circumference of the inner circular rail 32. Pairs of wheels 33d with vertical rotational axes are carried by channel member 33b and disposed above and below the channel member 33b at spaced intervals along its length. The wheels 33d ride along the vertical wall portion 32d of circular rail 32. A downwardly extending lip portion 32e of circular rail 32 is engageable with the upper series of wheels 33d to hold the semicircular channel member 33b on the circular rail 32.

Similarly, the outer curtain 29a is provided with curtain rings 29c supported by cords 33e secured to a further outer semicircular channel member 33f. The semicircular channel member 33f is provided with wheels as described above which ride around on a further circular rail 32a disposed within the outer wall 31a and spaced outwardly from the circular rail 32. The circular rail 32a is carried by vertically movable guide members 33a which ride on vertically extending guide rails 34a fixed to the inner surface of outer wall 31a. Control ropes 35a connected to guide members 33a extend to a rope drum (not shown) which permits the circular rail 32a to be raised or lowered independently of the inner circular rail 32. This permits independent raising and lowering of the inner and outer curtains 29 and 29a.

Fig. 7 shows means for causing the semicircular channel members 33b and 33f to ride around on the vertically movable circular rails 32 and 32a, respectively. Fixed to inner rail 32 is an appropriately journaled rope drum 36. A rope 37 with its ends secured to the ends of semicircular channel 33b lies in channel member 33b and is wrapped around rope drum 36. A vertically extending drive shaft 38 is connected to rope drum 36 and is vertically movable with circular rail 32. Rotation of drum 36 by drive shaft 38 will displace the semicircular channel 33b circumferentially as desired through an arc of substantially 180°. A rope drum 36a having a rope 37a wound therearound similarly causes circumferential displacement of semicircular channel member 33f around circular track 32a, the drum 36a being driven by a vertically movable drive shaft 38a.

According to Fig. 1, Fig. 2 upper part, and Fig. 5, rails 40 are arranged above the annular surface and the main stage 20, intended to guide electrically controlled and displaceable crabs or trolleys 41. These rails are laid in groups, whereby the individual groups cover sectors of the annular surface so that the respective axes of the groups may be arranged radially. The crabs and trolleys 41 are used for handling the shift-scenes 42, which latter—in consequence of the displaceability of these former manipulative elements—can be located in any position. In the intervals between the individual groups of rails 40 manipulating and illuminating bridges 43 are provided. In the intervals 40 of the guide rails within each group of rails vertically adjustable frames are arranged for taking up the lighting units 44.

In order to provide a sufficient illumination, taking into account the various possibilties of use of the building, the lower edge of the outer cylindrical wall 31a is—according to Fig. 6—made into a gangway 45, the handrail 46 or railing 47 of which serves for shiftably locating illuminating bodies, and of accommodating a proscenium 48 (Fig. 1).

The central illumination gondola 52 is arranged in the opening 53 of the ceiling 54, so as to fill said opening in the downward direction. On the bottom of the illumination gondola 52 playing faces 56 are arranged, according to Fig. 10, so as to be invisible from below, by means of which the central part 1 can be illuminated. Furthermore at the inner side of the trellis work 31 are the manipulation bridges 44, and at the rim of the gondola 52 illuminating bodies can be arranged.

Fig. 10 shows additionally that the space above the annular face 2, serving for taking up the shift-scene pulls, can be closed by a suitable, tiltable ceiling 57, subdivided into segments. The parts of the ceiling 57 may be tilted up e. g. by means of pull ropes 58.

For reducing the space of the "house" and of the corresponding stage for chamber plays or chamber music, the following arrangement has been provided according to the Figs. 8 and 9.

On the parapet 59 of the orchestra room 10 a curved frame is arranged, vertically adjustable e. g. by means of shear-like parts 60 lined for a proscenium, a curtain 61 being shiftably attached to said frame. The orchestra space 10 itself and the first rows of seats are covered by a stage or pre-stage 62. The space above the annular face 2 is closed by the partition 29.

What I claim is:

1. In a building for theatrical and other performances, in combination a rotatable disc-shaped central part, an unobstructed annular part completely surrounding said central part at substantially the same average level and having a continuous unobstructed upper surface for its entire length, said central part having a tiltable unobstructed floor providing a free view to the annular part, means for imparting rotary motion to said central part, means for tilting the floor of said central part, whereby the position of said central part in relation to said annular part may be varied, and rows of seats arranged in curves concentric to the axis located upon at least one of the two parts comprising said central part and said annular part of the annular part and being subdivided into segments selectively settable either on the central part in a symmetrical position, or on the annular part.

2. In a building for theatrical and other performances, in combination a rotatable disc-shaped central part, an unobstructed annular part completely surrounding said central part at substantially the same average level and having a continuous unobstructed upper surface for its entire length, said central part having a tiltable unobstructed floor providing a free view to the annular part, means for imparting rotary motion to said central part, means for tilting the floor of said central part, the floor of the annular part being at least partly formed of tiltable segment members distributed all around its periphery, and means for tilting and lifting said segment members, said members having surfaces, constituting inclined faces, for accommodating seats and having surfaces for producing scenic effects.

3. In a building for theatrical and other performances, in combination a rotatable disc-shaped central part, an unobstructed annular part completely surrounding said central part at substantially the same average level and having a continuous unobstructed upper surface for its entire length, said central part having a tiltable unobstructed upper floor providing a free view to the annular part, means for imparting rotary motion to said central part, means for tilting the floor of said central part, the floor of the annular part being at least partly formed of segment members distributed all around its periphery and each segment member comprising an upper panel, a lower panel, a central pivot post fastened to the lower panel, a ball and socket connection between the pivot post and the upper panel for supporting the latter panel, and operating means for tilting said upper panel including rollers, a pull rope connected to the upper panel and means for actuating the pull rope.

4. In a building for theatrical and other performances, in combination a rotatable disc-shaped central part, an unobstructed annular part completely surrounding said central part at substantially the same average level and having a continuous unobstructed upper surface for its entire length, said central part having a tiltable unobstructed upper floor providing a free view to the annular part, a ring under said floor, a ring under said first named ring, said rings being rotatable independently of each other, said rings constituting means for tilting the floor of said central part, whereby the position of said central part in relation to said annular part can be varied.

5. In a building for theatrical and other performances, in combination a rotatable disc-shaped central part, an unobstructed annular part completely surrounding said central part at substantially the same average level and having a continuous unobstructed upper surface for its entire length, said central part having a tiltable unobstructed upper floor providing a free view of the annular part, a ring under said floor, another ring under said first-named ring, said rings being rotatable independently of each other, said rings constituting means for tilting the floor of said central part without rotation thereof, whereby the position of said central part in relation to said annular part may be varied.

6. In a building for theatrical and other performances, a rotatable disc-shaped central part, an unobstructed annular part completely surrounding said central part at substantially the same average level with an annular gap between said parts, said central part having a tiltable unobstructed upper floor providing a free view of the surface of the annular part, means for imparting rotary motion to said central part, means for tilting the floor of said central part, and floor elements interposed between the central part and the annular part bridging the gap therebetween.

7. In a building for theatrical and other performances, in combination a rotatable disc-shaped central part, an unobstructed annular part surrounding said central part, said central part having a tiltable unobstructed upper floor providing a free vision of the annular part, means for imparting rotary motion to said central part, and means for tilting the floor of said central part, said tilting means comprising a first wedge-shaped ring bearing the central part, a second movable wedge-shaped ring coaxially disposed below said first wedge-shaped ring, a stationary guideway for said second wedge-shaped ring, roller means between said first and second wedge-shaped rings, roller means between said second wedge-shaped ring and the guideway, said second wedge-shaped ring being adapted to be turned through a predetermined angle while said first wedge-shaped ring is held against rotation.

8. In a building for theatrical and other performances, in combination a rotatable disc-shaped central part, an unobstructed annular part surrounding said central part at substantially the same level and having a continuous unobstructed upper surface of its entire length, said central part having a tiltable unobstructed upper floor providing a free vision of the annular part, means for imparting rotary motion to said central part, means for tilting the floor of said central part, and cylindrical curtain means displaceable near the inner periphery of the annular part in vertical and horizontal directions for screening any desired part of the upper surface of the annular part from the central part.

9. In a building for theatrical and other performances, in combination a rotatable disc-shaped central part, an unobstructed annular part surrounding said central part at substantially the same level and having a continuous unobstructed upper surface of its entire length, said central part having a tiltable unobstructed upper floor providing a free view of the annular part, means for imparting rotary motion to said central part, means for tilting the floor of said central part, two cylindrical movable curtain elements disposed near the inner periphery of the annular part and each covering about 180° of said periphery, and means for moving said curtain elements in vertical and peripheral directions, for screening any desired part of the upper surface of the annular part from the central part.

10. In a building for theatrical and other performances, in combination a rotatable disc-shaped central part, an unobstructed annular part surrounding said central part at substantially the same level and spaced therefrom and having a continuous unobstructed upper surface for its entire length, said central part having a tiltable unobstructed upper floor providing a free view of the annular part, means for imparting rotary motion to said central part, means for tilting the floor of said central part, two cylindrical movable curtain elements disposed near the inner periphery of the annular part and each covering about 180° of said periphery, means for moving said curtain elements in vertical and peripheral directions, for screening any desired part of the upper surface of the annular part from the central part, and a double-walled cylinder arranged above the space between the central part and the annular part, with its lower edge spaced from the level of the upper surfaces of the central and annular parts so as to provide a free view from the annular part to the central part and vice versa, said double-walled cylinder containing the cylindrical curtain elements and the moving means therefor.

11. In a building for theatrical and other performances, in combination a rotatable disc-shaped central part, an unobstructed annular part surrounding said central part at substantially the same level and spaced therefrom and having a continuous unobstructed upper surface for its entire length, said central part having a tiltable unobstructed upper floor providing a free view of the annular part, means for imparting rotary motion to said central part, means for tilting the floor of said central part, two cylindrical movable curtain elements disposed near the inner periphery of the annular part and each covering about 180° of said periphery, means for moving said curtain elements in vertical and peripheral directions, for screening any desired part of the upper surface of the annular part from the central part, and a double-walled cylinder arranged above the space between the central part and the annular part, with its lower edge spaced from the level of the upper surfaces of the central and annular parts so as to provide a free view from the annular part to the central part and vice versa, said double-walled cylinder containing the cylindrical curtain elements and the moving means therefor said moving means comprising guide rails vertically adjustable within the double-walled cylinder.

12. In a building for theatrical and other performances, in combination a rotatable disc-shaped central part, an unobstructed annular part surrounding said central part at substantially the same level and spaced therefrom and having a continuous unobstructed upper surface for its entire length, said central part having a tiltable unobstructed upper floor providing a free view of the annular part, means for imparting rotary motion to said central part, means for tilting the floor of said central part, two cylindrical movable curtain elements disposed near the inner periphery of the annular part and each covering about 180° of said periphery, means for moving said curtain elements in vertical and peripheral directions, for screening any desired part of the upper surface of the annular part from the central part, and a double-walled cylinder arranged above the space between the central part and the annular part, with its lower edge spaced from the level of the upper surfaces of the central and annular parts so as to provide a free view from the annular part to the central part and vice versa, said double-walled cylinder containing the cylindrical curtain elements and the moving means therefor said moving means comprising guide rails vertically adjustable within the double-walled cylinder, carriages bearing the guide rails, vertical slide rails secured on the inner walls of the double-walled cylinder, and pull-ropes for vertically moving said carriages.

13. In a building for theatrical and other performances, in combination a rotatable disc-shaped central part, an unobstructed annular part surrounding said central part at substantially the same level and spaced therefrom and having a continuous unobstructed upper surface for its entire length, said central part having a tiltable unobstructed upper floor providing a free view of the annular part, means for imparting rotary motion to said central part, means for tilting the floor of said central part, two cylindrical movable curtain elements disposed near the inner periphery of the annular part and each covering about 180° of said periphery, means for moving said curtain elements in vertical and peripheral directions, for screening any desired part of the upper surface of the annular part from the central part, and a double-walled cylinder arranged above the space between the central part and the annular part, with its lower edge spaced from the level of the upper surfaces of the central and annular parts so as to provide a free view from the annular part to the central part and vice versa, said double-walled cylinder containing the cylindrical curtain elements and the moving means therefor said moving means comprising guide rails vertically adjustable within the double-walled cylinder, and capstan and pull-rope means for moving the curtain elements in peripheral directions.

14. In a building for theatrical and other performances, in combination a rotatable disc-shaped central part, an annular part surrounding said central part at substantially the same level and having a continuous unobstructed upper surface for its entire length, said central part having a tiltable unobstructed upper floor providing a free view of the annular part, means for imparting rotary motion to said central part, means for tilting the floor of said central part, two cylindrical movable curtain elements disposed near the inner periphery of the annular part and each covering about 180° of said periphery, means for moving said curtain elements in vertical and peripheral directions, for screening any desired part of the upper surface of the annular part from the central part, each curtain element having an opening and including an applause curtain for closing said opening.

15. In a building for theatrical and other performances, in combination a rotatable disc-shaping said central part, an unobstructed annular part surrounding said central part at substantially the same level and having a continuous unobstructed upper surface for its entire length, said central part having a tiltable unobstructed upper floor providing a free view of the annular part, means for imparting rotary motion to said central part, means for tilting the floor of said central part, groups of rails arranged above the annular part, each group comprising a plurality of parallel rails whose middle axes are radially directed, and electrically controlled movable crabs depending from said rails for handling the various articles constituting the setting on the stage.

16. In a building for theatrical and other performances, in combination a rotatable disc-shaped central part, an unobstructed annular part surrounding said central part at substantially the same level and having a continuous unobstructed upper surface for its entire length, said central part having a tiltable unobstructed upper floor providing a free view of the annular part, means for imparting rotary motion to said central part, means for tilting the floor of said central part, groups of rails arranged above the annular part, each group comprising a plurality of parallel rails whose middle axes are radially directed, electrically controlled movable crabs depending from said rails for handling the various articles constituting the setting on the stage, and illuminating devices arranged between various groups of rails for illuminating the central and annular parts.

17. In a building for theatrical and other performances, in combination a rotatable disc-shaped central part, an unobstructed annular part surrounding said central part at substantially the same level and having a continuous unobstructed upper surface for its entire length, said central part having a tiltable unobstructed upper floor providing a free view of the annular part, means for imparting rotary motion to said central part, means for tilting the floor of said central part, groups of rails arranged above the annular part, each group comprising a plurality of individual rails disposed in mutually parallel relationship, the common axes of the respective groups being radially directed, electrically controlled movable crabs depending from said rails for handling the various articles constituting the setting on the stage, and ceiling means screening the rails and crabs from below.

18. In a building for theatrical and other performances, in combination a rotatable disc-shaped central part, an unobstructed annular part surrounding said central part at substantially the same level and spaced therefrom and having a continuous unobstructed upper surface for its entire length, said central part having a tiltable unobstructed upper floor providing a free view of the annular part, means for imparting rotary motion to said central part, means for tilting the floor of said central part, two cylindrical curtain movable elements disposed near the inner periphery of the annular part and each covering about 180° of said periphery, means for moving said curtain elements in vertical and peripheral directions, for screening any desired part of the upper surface of the annular part from the central part, a double-walled cylinder arranged above the space between the central part and the annular part, with its lower edge spaced from the level of the upper surfaces of the central and annular parts so as to provide a free view from the annular part to the central part and vice versa, said double-walled cylinder being of such shape and size, whereby said cylinder contains the cylindrical curtain elements and the moving means therefor, the lower edge of the double-walled cylinder comprising a gangway, a railing on the gangway for shiftably supporting illuminating means for the central and annular parts and a mechanically movable proscenium on the railing.

19. In a building for theatrical and other performances, in combination a rotatable disc-shaped central part, an unobstructed annular part completely surrounding said central part at substantially the same average level and having a continuous unobstructed upper surface for its entire length, said central part having a tiltable unobstructed upper floor providing a free view of the annular part, means for imparting rotary motion to said central part, and means for tilting the floor of said central part, whereby the position of said central part in relation to said annular part can be varied, the central part having a peripheral segment with a deep well portion for accommodation of an orchestra.

20. In a building for theatrical and other performances, in combination a rotatable disc-shaped central part, an unobstructed annular part completely surrounding said central part at substantially the same average level annd having a continuous unobstructed upper surface for its entire length, said central part having a tiltable unobstructed upper floor providing a free view of the annular part, means for imparting rotary motion to said central part, and means for tilting the floor of said central part, whereby the position of said central part in relation to said annular part can be varied, the central part having a peripheral segment with a deep well portion for accommodation of an orchestra, a covering for the orchestra well, an orchestra parapet and curtain means movable in the plane defined by said orchestra parapet.

21. In a building for theatrical and other performances, in combination a rotatable disc-shaped central part, an unobstructed annular part completely surrounding said central part at substantially the same average level and having a continuous unobstructed upper surface for its entire length, said central part having a tiltable unobstructed upper floor providing a free view of the annular part, means for imparting rotary motion to said central part, means for tilting the floor of said central part, whereby the position of said central part in relation to said annular part can be varied, a ceiling above the central part having an opening, and an illumination gondola arranged above the center part within the opening in the ceiling for illuminating the central and annular parts.

22. In a building for theatrical and other performances, in combination a rotatable disc-shaped central part, an unobstructed annular part completely surrounding said central part at substantially the same average level and having a continuous unobstructed upper surface for its entire length, said central part having a tiltable unobstructed upper floor providing a free view of the annular part, means for imparting rotary motion to said central part, means for tilting the floor of said central part, whereby the relative position of said central part in relation to said annular part can be varied, a ceiling above the central part having an opening, and an illumination gondola arranged above the center part within the opening in the ceiling for illuminating the central and annular parts and a vertically adjustable illuminator's stand on said gondola.

23. In a building for theatrical and other performances, in combination a rotatable disc-shaped central part, an unobstructed annular part completely surrounding said central part at substantially the same average level and having a continuous unobstructed upper surface for its entire length, said central part having a tiltable unobstructed upper floor providing a free view of the annular part, means for imparting rotary motion to said central part, means for tilting the floor of said central part, whereby the relative position of said central part in relation to said annular part can be varied, a ceiling above the central part having an opening, and an illumination gondola arranged above the center part within the opening in the ceiling, the bottom of the illuminating gondola being shaped to close said opening of the ceiling and play-faces on the gondola for illuminating central and annular parts.

References Cited in the file of this patent

UNITED STATES PATENTS

| Number | Name | Date |
|---|---|---|
| 366,290 | Adam | July 12, 1887 |
| 1,008,886 | Bishop | Nov. 14, 1911 |
| 1,559,739 | Brown | Nov. 3, 1925 |
| 1,844,852 | Harvey | Feb. 9, 1932 |
| 1,868,068 | Moulton | July 19, 1932 |
| 2,259,646 | Liehburg | Oct. 21, 1941 |

FOREIGN PATENTS

| Number | Country | Date |
|---|---|---|
| 470,451 | Germany | Jan. 15, 1949 |